United States Patent [19]

Bailey

[11] Patent Number: 4,542,473

[45] Date of Patent: Sep. 17, 1985

[54] STACKED DIMENSION AND DEVIATION CALCULATOR APPARATUS FOR USE WITH GAGE BLOCKS

[75] Inventor: Donald H. Bailey, Bloomfield Hills, Mich.

[73] Assignee: Suburban Tool, Inc., Birmingham, Mich.

[21] Appl. No.: 427,859

[22] Filed: Sep. 29, 1982

[51] Int. Cl.[4] .................. G01B 5/06; G06F 15/00
[52] U.S. Cl. .................... 364/560; 33/567; 73/1 J; 364/563
[58] Field of Search ............. 33/174 H; 73/1 J; 364/474, 560, 563, 571

[56] References Cited

U.S. PATENT DOCUMENTS

| | | | |
|---|---|---|---|
| 2,134,062 | 10/1938 | Trbojevich | 33/174 H |
| 2,547,087 | 4/1951 | Milligan | 33/174 H |
| 4,043,045 | 8/1977 | Rodriguez | 33/174 H X |
| 4,180,812 | 12/1979 | Kaltenbach et al. | 340/706 |
| 4,181,958 | 1/1980 | Juengel et al. | 364/560 |
| 4,258,421 | 3/1981 | Juhasz et al. | 364/424 |
| 4,305,126 | 12/1981 | Beier et al. | 364/413 |
| 4,321,674 | 3/1982 | Krames et al. | 364/413 |

Primary Examiner—Errol A. Krass
Assistant Examiner—Edward R. Cosimano
Attorney, Agent, or Firm—Basile, Weintraub & Hanlon

[57] ABSTRACT

A gage block set includes a plurality of gage blocks mounted within a case, each gage block having opposed gage surfaces with a nominal dimension therebetween and a known deviation from the nominal dimension. Sensors associated with each gage block sense the removal of each gage block from the case. A signal generator provides a distinct signal corresponding to which gage block is removed from the case. A memory stores the known deviation of each gage block within the case. A control unit responsive to the signal generator addresses and retrieves from the memory the known deviation for each gage block which is removed from the case, combines the known deviation with the deviations of previously removed gage blocks and outputs the total deviation to a display device.

8 Claims, 4 Drawing Figures

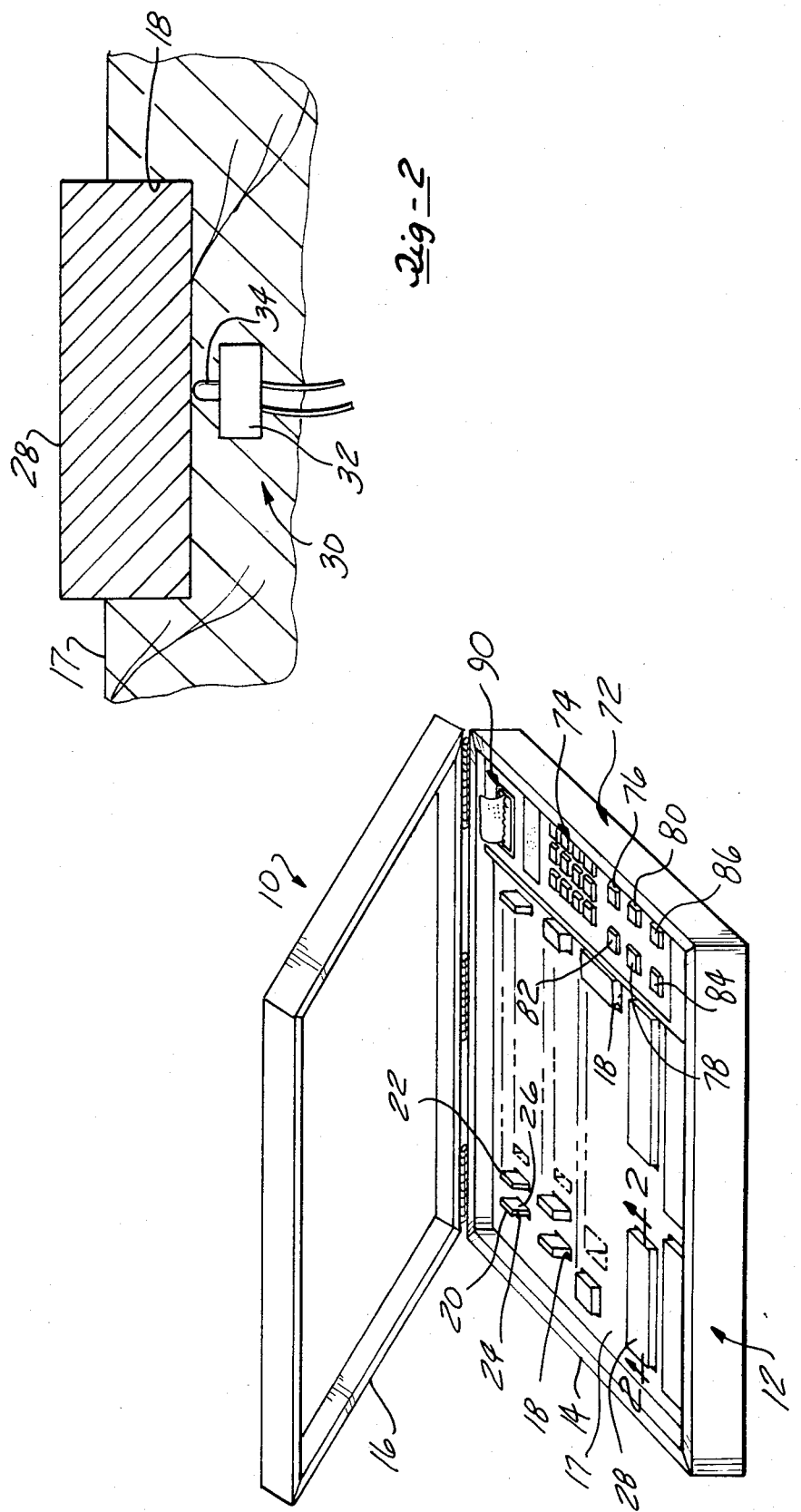

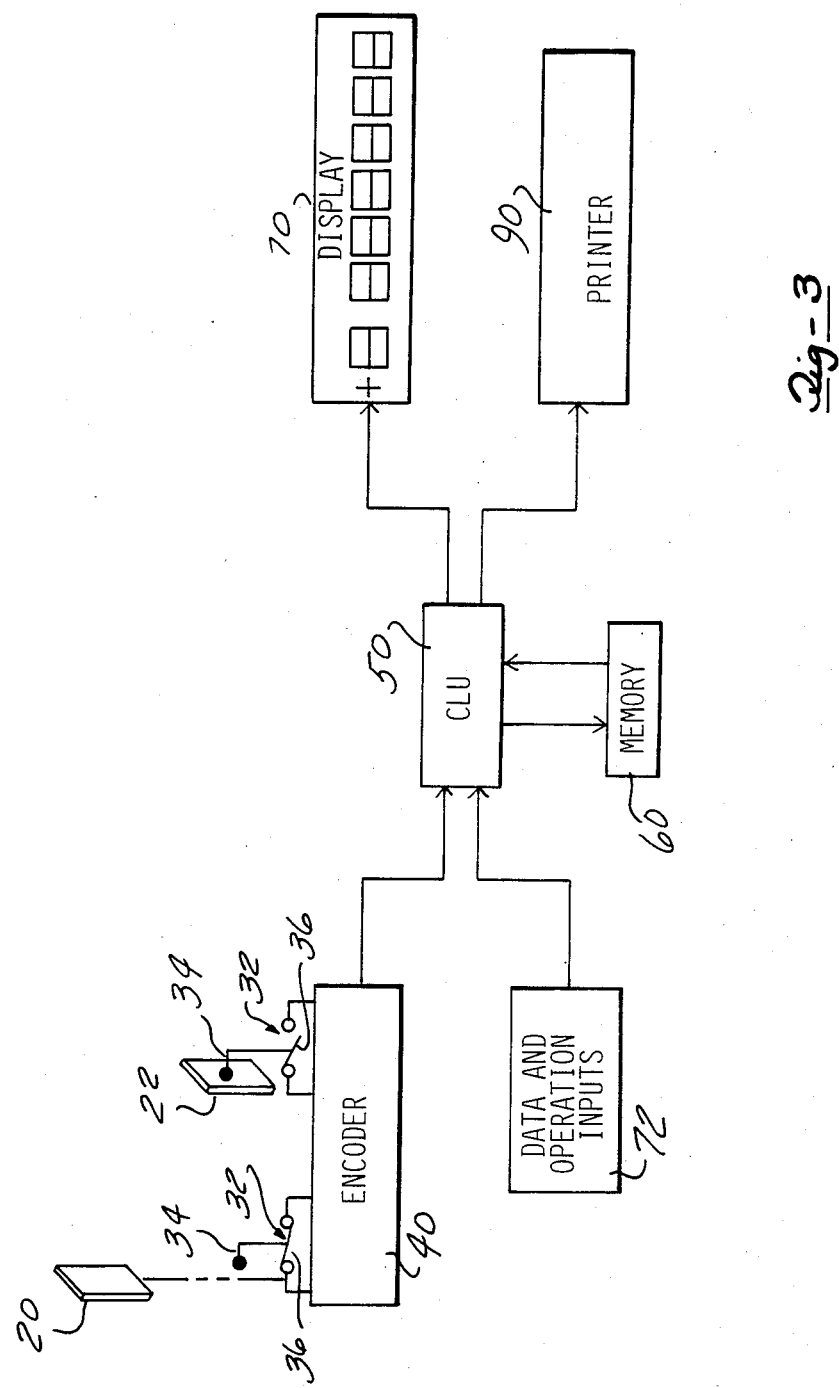

STACKED DIMENSION AND DEVIATION CALCULATOR APPARATUS FOR USE WITH GAGE BLOCKS

BACKGROUND OF THE INVENTION

1. Field of the Invention:

This invention relates, in general, to gage blocks sets and, more specifically, to special purpose computing apparatus for use with gage block sets.

2. Description of the Prior Art:

Gage blocks are widely used in industry to establish a given dimension during tool set up or to check a dimension of a finished work piece. The gage blocks are typically packaged in a set which contains a plurality of blocks, each having a different, nominal dimension between two parallel gage surfaces. In this manner, selected ones of the gage blocks may be placed in a stack to establish any given dimension.

However, despite the elaborate machining operations which are used in manufacturing gage blocks, it is impossible to perfectly machine each block to the given nominal dimension between the parallel gage surfaces. As any variance or deviation, even if only a few millions of an inch or a few millimeters, in the nominal dimension of the gage block could effect its ultimate use, it is essential to know the deviation of each gage block from the nominal dimension so that the total deviation of the stacked arrangement of gage blocks may be determined and steps taken to compensate for such total deviation.

Due to the critical applications with which gage blocks are employed, each gage block is subjected to rigorous testing and certification procedures in order to establish the amount of deviation from the nominal dimension between the gage surfaces. These deviations are set forth on a deviation chart which accompanies each gage block set and which provides the nominal gaging dimension and deviation of each gage block in the set.

Thus, in usage, the machinist must refer to the deviation chart to determine the deviation of the gage block which he has selected and combine that deviation with the deviations of previously selected gage blocks in order to obtain the total deviation of the stacked arrangement of gage blocks. Obviously, this manual operation is subject to numerous numbers, such as arithmetic errors in totaling the deviations of the selected gage blocks or the choosing of the wrong deviation from the deviation chart. Furthermore, this procedure is time-consuming.

Thus, it would be desirable to provide a means for overcoming the problems encountered with previously devised methods for calculating the total deviation of a stacked arrangement of gage blocks. It would also be desirable to provide a means for automatically totalling and displaying the deviations of the gage blocks selected for use without any manual intervention.

SUMMARY OF THE INVENTION

There is disclosed herein a unique gage block set which includes means for automatically totaling and displaying the total or combined deviation of a plurality of gage blocks which have been removed from the gage block set. The gage block set includes a plurality of gage blocks which are removably mounted within a case. As is conventional, each gage block is formed with opposed gage surfaces having a nominal dimension therebetween and a measured deviation from the nominal dimension. Sensor means are mounted in the case and associated with each gage block for sensing the removal of each gage block from the case. Means are provided for generating a signal corresponding to each gage block which has been removed from the case. A control unit, which is responsive to the signal generating means, addresses and retrieves from a memory, the stored deviation of the gage block which has been removed from the case. The control unit combines the deviation of the removed gage block, with the total deviation of previously removed gage blocks and outputs the total deviation to a display means which provides a visual display of the total deviation of the selected gage blocks.

In a preferred embodiment, the sensor means comprises a plurality of electrical switches, each being associated with one gage block in the set and which senses the presence or absence of the gage block within the case. The signal generating means comprises an encoder which provides a distinct output signal for each gage block which is removed from the case.

Optionally, a printing means may be connected to the control unit for providing a hard copy of the nominal dimension of each gage block which is moved from the case, the deviation of each removed gage block, as well as the total deviation of all of the gage blocks which have been removed from the gage block case.

Reprogramming the memory with new deviations for each gage block is also possible as well as the display of the deviation of each gage block as it is removed from the case.

The gage block set of the present invention overcomes many of the problems encountered with previously devised gage block sets relating to the calculation of the total deviation of the gage blocks which have been removed from the case for use at one time. The gage block set of the present invention automatically totals the deviations of all the gage blocks removed from the case thereby eliminating manual calculation and preventing any user errors during such arithmetic calculation or the possibility of choosing the wrong deviation from the standard deviation chart. In addition, the automatic totalization and display of the deviation of the gage blocks removed from the case eliminates set up time and increases overall production.

BRIEF DESCRIPTION OF THE DRAWING

The various features, advantages and other uses of the present invention become more apparent by referring to the following detailed description and drawing in which:

FIG. 1 is perspective view of a gage block set constructed in accordance with the teachings of the present invention;

FIG. 2 is a cross sectional view generally taken along line 2—2 in FIG. 1;

FIG. 3 is a block diagram of the circuitry employed in the gage block set of the present invention.

DESCRIPTION OF THE PREFERRED EMBODIMENTS

Figure 4:
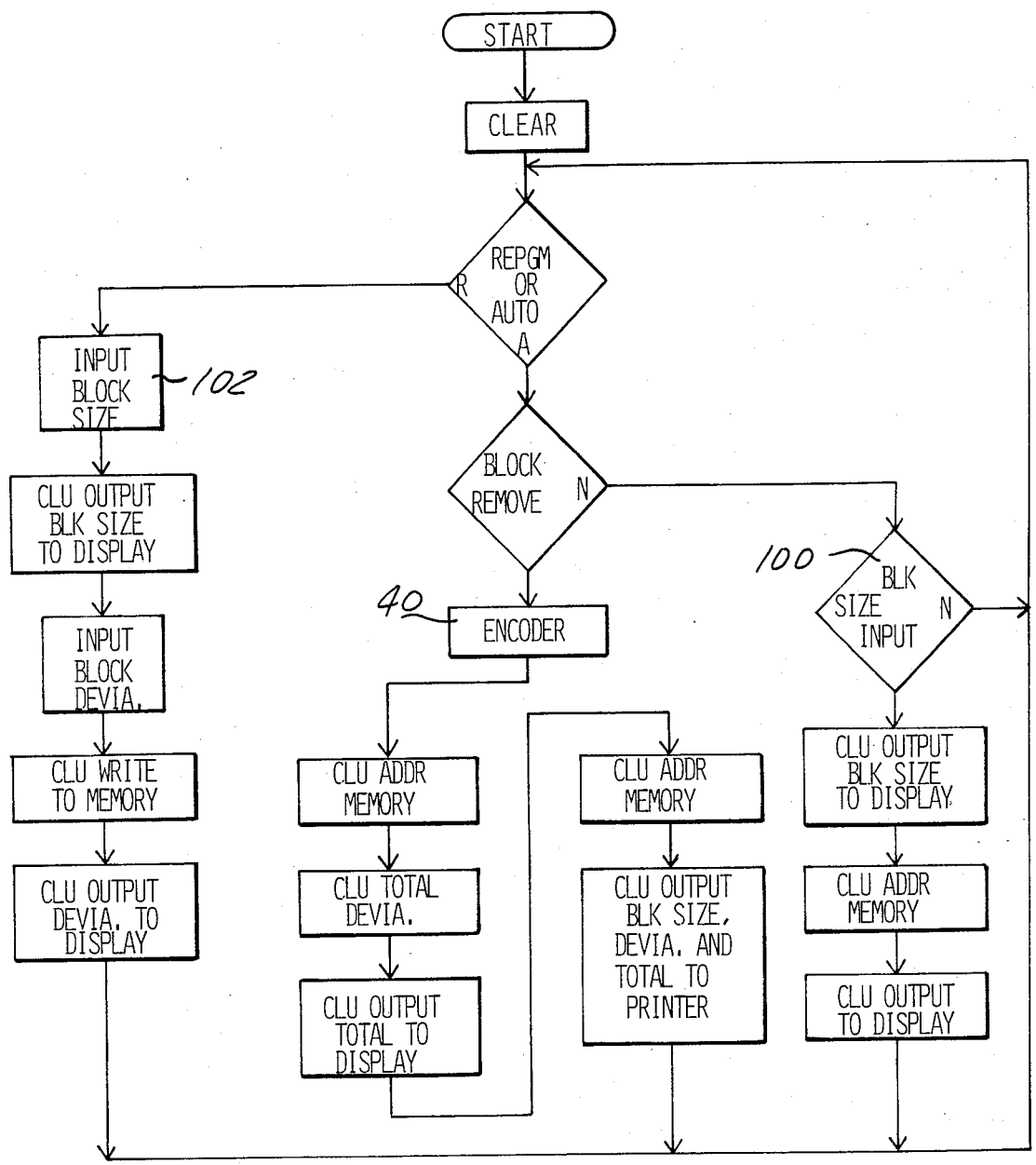
FIG. 4 is a flow diagram illustrating the operational sequence of the control unit employed in the gage block set of the present invention.

Throughout the following description and drawing, the same reference number is used to identify the same component illustrated in multiple figures of the drawing.

Referring now to the drawing, and to FIGS. 1, 2 and 3 in particular, there is illustrated a gage block 10 which is constructed in accordance with the teachings of the present invention. The gage block set set 10 provides an automatic totalization of the standard deviation of all the gage blocks which have been removed from the case for use at one time and displays the total deviation. In addition, an optional hard copy via an integral printer may be obtained.

As shown in FIG. 1, the gage block set 10 includes a case 12 having a bottom portion 14 and a hinged cover 16. The bottom portion 14 is formed with a hollow interior and has a raised base surface 17. A plurality of spaced receptacles or cavities 18 are formed in the base surface 17 to receive individual gage blocks, such as gage blocks 20, 22, etc.

As is conventional, gage blocks are formed in a solid body having a substantially rectangular cross-sectional configuration. Each gage block, such as gage block 20, is formed with opposed, parallel gage surfaces 24 and 26. Gage surfaces 24 and 26 are machined for flatness and parallelism and are spaced apart at a known nominal dimension.

Such receptacle 18 formed in the case 12 has dimensions substantially corresponding to the dimensions of each gage block so as to removably receive each gage block.

In use, selected ones of the gage blocks mounted within the case 12 are removed from the case 12 and arranged in a stack to establish a predetermined dimension for use in tool set up or to check the dimension of a finished work piece.

As is conventional, a plurality of gage blocks are provided in each gage block set and differ from each other in incremental nominal dimensions, either in millimeters or inches. Thus, gage block 20, illustrated in FIG. 1, may have a nominal dimension of 1.0 mm; while the adjacent gage block 22 has a nominal dimension of 1.005 mm.

The remaining gage blocks contained in the gage block set 10 differ from the adjacent gage blocks by 1 or more millimeter or inch increments.

In this manner, selected ones of the gage blocks may be removed from the case 12 and arranged in a stack to establish any dimension.

However, as is well known, the manufacturing of gage blocks is not capable of producing perfect nominal dimensions between the opposed gaging surfaces of each block. Rigorous verification and certification procedures are employed to determine the deviation of dimension between the gaging surfaces of each gage block from the established nominal dimension. These deviations are typically provided for use by a skilled tradesman.

As shown in greater detail in FIG. 2, the gage block set 10 of the present invention includes sensor means denoted in general by reference number 30. Preferably, the sensor means 30 comprises a plurality of electrical switches 32, each having a spring-biased plunger 34 extending outward from a body housing a movable contact. One electrical switch 32 is associated with each gage block in the gage block set 10 and is positioned within the case 12 such that the movable plunger 34 contacts one of the side surfaces of each gage block, such as gage block 28 shown in FIG. 2. In this manner, the presence of each gage block, such as gage block 28, within its respective receptacle 18, in the gage block set case 12 will depress the plunger of its associated switch 34. Conversely, removal of the gage block 28 from the cavity 18 will enable the plunger 34 to extend outward from the body of the electrical switch 32.

Each switch 32 includes a switchable contact 36, shown in FIG. 3, which moves between closed and open positions in response to movement of the plunger 34. Thus, as shown in FIG. 3, removal of a gage block, such as gage block 20, from the case 12 will cause the plunger 34 to extend outward from the switch the 32 associated with gage block 20 such that the contact 36 moves to the normally closed position. Alternately, the presence of a gage block, such as gage block 22, within its respective receptacle 18 in the case 12 will depress the plunger 34 and cause the contact 36 to move to an open position, as illustrated in FIG. 3. In this manner, the sensor means 30 provides an indication of the removal of each gage block from the case 12.

The gage block set 10 of the present invention includes means for generating a signal corresponding to which gage block has been removed from the case 12. The signal generating means, which is mounted within the case 12, provides a distinct output signal corresponding to the removal of each gage block from the case 12.

Although each sensor means 30 may be hard wired by suitable conductors to the control unit described hereafter, it is preferred that a digital encoder 40 be employed so as to reduce the number of electrical connections that are required. As shown in FIG. 3, the encoder 40 receives input signals from each electrical switch 32 and provides at its output, a digitally coded signal indicating which gage block has been removed in the case 12.

The gage block set 10 further includes control means 50 in the form of a control or central logic unit which is connected to and responsive to the output from the signal generating means or encoder 40. The control means 50 preferably comprises a computer logic device, such as a micro-processor, which is mounted within the case 12. The control means 50 includes appropriate input and output registers, memory buffers and internal working registers. Alternately, it will be apparent that a discrete logic circuit could be devised to implement the specific functions of the control means 50 which will be described in greater detail hereinafter.

The gage block set 10 of the present invention also includes a memory means 60 which is operative for storing the nominal dimension of each gage block mounted within the case 12 and the known deviation of each gage block. The memory means 60 may be any appropriate type of memory device. However, it is preferred that a ROM or EAROM be utilized for permanently storing the necessary information relating to each gage block mounted within the case 12.

The central logic unit 50 is programmed to generate the necessary memory addresses in response to receiving an output signal from the signal generating means or encoder 40 corresponding to the specific gage block which has been removed from the case 12. The central logic unit 50 retrieves from the memory 60 the deviation of the gage block which has been removed from the case 12.

The central logic unit 50, as will be described in greater detail hereafter, is programmed to total the deviation of each gage block which has been removed from the case 12 with the total deviation of the gage blocks which have been previously removed from the case 12 and to output the new total deviation to a display means 70.

The display means 70 may be any appropriate display device, such as a light emitting diode array, (LED) or a liquid crystal display (LCD). The display 70 is provided with an appropriate number of digits as well as plus and minus signs and an appropriately positioned decimal point.

As shown in FIGS. 1 and 3, additional data and operation inputs 72 are provided to the central logic unit 50. These inputs 72 may be provided via manually operated pushbuttons mounted in the case 12. Such inputs include numeric data 74, on/off control 76, + or − deviation information 78 and 80, respectively, automatic or reprogramming mode selection 82, as well as printer control 84 and clear display and total 86.

Optionally, the gage block set 10 of the present invention may be provided with a printer means 90 which provides a hard copy of the nominal dimension of the gage block which has been removed from the case 12, the deviation of the removed gage block, as well as the total deviation of all of the gage blocks which have been removed from the case 12 for a single gaging operation. The printer 90 may be any suitable printer, such as those commonly used in calculators, for printing numeric data.

Referring now to FIG. 4, there is illustrated a flow diagram of the various modes of operation of the central logic unit 50. In order to activate the central logic unit 50, the on/off push button 76 is depressed to indicate a start state which activates the central logic unit 50. The clear display and total push button 86 is then pushed to clear the display 70 as well as the internal working registers of the central logic unit 50. In a normal mode of operation, denoted by "auto", the central logic unit 50 is responsive to the removal of any gage block from the gage block case 12.

When a gage block is removed from the case 12, the signal generating means or encoder 40 provides at its output a coded signal indicating which gage block has been removed from the case 12. Upon receiving this signal, the central logic unit 50 addresses the memory 60 and receives therefrom the standard deviation of the gage block which has been removed from the case 12. The central logic unit 50 combines this deviation with the deviations of any previously removed gage blocks for a particular gaging operation outputs a total to the display means 70 which provides a visible indication of the total deviation of all of the gage blocks which have been removed from the case 12.

The central logic unit 50 then addresses the memory 60 again and receives therefrom the nominal dimension of gage block which has been removed from the gage block case 12, the deviation of the gage block which has been removed and the total deviations of all of the gage blocks which have been removed from the gage block case 12. The central logic unit 50 then outputs this information to the printer 90 to provide a hard or permanent copy of such information.

As the deviation of each gage block mounted within the case 12 is stored within the memory 60, the deviation of any specific gage block may be displayed by the tradesman manually inputting via the data input keyboard 74, step 100 in FIG. 4, the nominal dimension of the gage block which he wishes to remove from the gage block 12. Upon receiving this information, the central logic unit addresses the memory 60 and outputs to the display 70 the deviation of the gage block which has been entered. Prior to addressing the memory 60, the central logic unit 50 outputs to the display means 70, for display, the nominal dimension or block size of the gage block selected by the tradesman.

The memory means 60 may be reprogrammed with new deviations for each gage block within the gage block set 10. In selecting this mode of operation, a switch, preferably mounted and protected within the interior of the case 12 is activated to select the reprogramming mode. The tradesman, step 102, then inputs via the data input keyboard 74 the nominal dimension or block size of the gage block which he wishes to reprogram and depresses pushbutton 82 to enter the data into the central logic unit 50. The central logic unit 50 outputs the input nominal dimension to the display 70 for verification. The tradesman then inputs via the data input keyboard 74 the new deviation for the specified gage block. The central logic unit 50 inputs and stores this data within the memory 60. The new deviation is also displayed on the display means 70. In this manner, the deviation of each gage block within the gage block set 10, upon remachining and reverification, may be stored in the memory 60 for future use.

It should also be understood that while the numeric keyboard 74 has been depicted as being mounted within the case 12, it is also possible to construct the case 12 without the keyboard 74 and to provide suitable connectors for connecting a separate keyboard unit to the case 12 for reprogramming the memory 60.

Thus, there has been disclosed a gage block set which includes means for automatically totaling and displaying the total deviation of all of the gage blocks which have been removed from the gage block set for a single gaging application. The gage block set of the present invention eliminates the manual calculation previously required to calculate the total deviation of the gage blocks selected for use, thereby eliminating any possibility of arithmetic errors.

I claim:

1. A gage block set comprising:
   a case;
   a plurality of gage blocks removably mounted within the case, each gage block having opposed gage surfaces with a nominal dimension therebetween and a known deviation from the nominal dimension;
   sensor means, associated with each gage block, for sensing the removal of each gage block from the case;
   means for generating a signal corresponding to which gage block has been removed from the case;
   memory means for storing the known deviation of each gage block in the case;
   control means, responsive to the signal generating means, for addressing and obtaining from the memory means the known deviation of the gage block which has been removed from the case and for totaling the deviation of the gage block removed from the case with the deviation of previously removed gage blocks; and
   display means, responsive to the control means, for displaying the total deviation of all of the gage blocks which have been removed from the case.

2. The gage block set of claim 1 wherein:
   the sensor means comprises an electrical switch associated with each gage block, each switch being responsive to the presence of a gage block within the case.

3. The gage block set of claim 1 wherein the signal generating means comprises:
encoding means, responsive to each sensor means, for generating a distinct signal for each gage block which is removed from the case.

4. The gage block set of claim 1 further including:
printer means, responsive to the control means, for printing the deviations of the gage blocks removed from the case.

5. The gage block set of claim 1 further including:
the memory means storing the nominal dimension of each gage block within the case; and
printer means, and wherein
the control means addresses the memory means and obtains the known deviation and the nominal dimension deviation with the known deviations of previously removed gage blocks and outputs the total deviation to the printer means for printing the nominal dimension, and known deviation of each gage block removed from the case and the total deviation of all of the gage blocks which have been removed from the case.

6. The gage block set of claim 1 further including:
numeric data input means for inputting to the control means new deviations for the gage blocks in the case.

7. The gage block set of claim 6 wherein the numeric data input means is mounted within the case.

8. A gage block set comprising:
a case;
a plurality of gage blocks removably mounted within the case, each gage block having opposed gage surfaces with a nominal dimension therebetween and a known deviation from the nominal dimension;
a plurality of electrical switches, each mounted with one gage block, for sensing the removal of each gage block from the case;
encoding means mounted in the case and responsive to the electrical switches generating a distinct signal corresponding to which gage block has been removed from the case;
memory means for storing the known deviation of each gage block in the case;
control means, responsive to the encoding means, for addressing and obtaining from the memory means the known deviation of the gage block which has been removed from the case and for totaling the deviation of the gage block removed from the case with the deviations of previously removed gage blocks; and
display means, responsive to the control means, for displaying the total deviation of all of the gage blocks which have been removed from the case.

* * * * *